US012665876B2

(12) United States Patent
Zhang et al.

(10) Patent No.: US 12,665,876 B2
(45) Date of Patent: Jun. 23, 2026

(54) SYSTEM AND METHOD FOR SERVER MONITORING AND PROBLEM RESOLUTION FOR ELECTRONIC MAIL MESSAGES

(71) Applicant: Bank of America Corporation, Charlotte, NC (US)

(72) Inventors: Yi Jason Zhang, Frisco, TX (US); Daniel Joseph Serna, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 604 days.

(21) Appl. No.: 17/937,609

(22) Filed: Oct. 3, 2022

(65) Prior Publication Data

US 2024/0114001 A1      Apr. 4, 2024

(51) Int. Cl.
H04L 9/40          (2022.01)

(52) U.S. Cl.
CPC ........ H04L 63/0236 (2013.01); H04L 63/205 (2013.01)

(58) Field of Classification Search
CPC ..... H04L 63/02; H04L 63/0236; H04L 63/20; H04L 63/205
See application file for complete search history.

(56) References Cited

U.S. PATENT DOCUMENTS

| | | | |
|---|---|---|---|
| 6,868,498 B1 | 3/2005 | Katsikas | |
| 7,219,148 B2 | 5/2007 | Rounthwaite et al. | |
| 7,231,428 B2 | 6/2007 | Teague | |
| 7,519,675 B2 | 4/2009 | Di Giorgio et al. | |
| 8,271,596 B1 | 9/2012 | Haskins et al. | |
| 8,572,185 B2 | 10/2013 | Williams et al. | |
| 8,646,043 B2 | 2/2014 | Katsikas | |
| 8,782,154 B2 | 7/2014 | Tomkow | |
| 8,782,184 B2 | 7/2014 | Furlong et al. | |
| 9,578,096 B2 | 2/2017 | Kallman et al. | |
| 9,800,677 B2 | 10/2017 | Wood | |
| 10,122,683 B2 | 11/2018 | Wilf et al. | |
| 10,171,413 B2 | 1/2019 | Levasseur et al. | |
| 10,182,026 B2 | 1/2019 | Tomkow | |
| 10,243,948 B2 | 3/2019 | Tonegawa | |
| 2008/0028078 A1* | 1/2008 | Saiki | H04L 63/0272 709/227 |

(Continued)

*Primary Examiner* — Amie C. Lin
*Assistant Examiner* — Ayub A Maye

(57)          ABSTRACT

A method is provided that comprises monitoring for a change in a first security configuration setting in a relay server and comparing the change in the first security configuration setting to historical data that contains validated authentication configuration settings that previously allowed for the delivery of a historical electronic mail message to an external network. The method further comprises identifying a candidate change to the first security configuration setting based on the comparison, where the candidate change to the first security configuration setting when implemented results in the delivery of a first electronic mail message to the external network. The method further comprises implementing the candidate change to the first security configuration setting such that the relay server allows the delivery of the first electronic message to the external network.

17 Claims, 2 Drawing Sheets

(56) References Cited

U.S. PATENT DOCUMENTS

| | | | |
|---|---|---|---|
| 2010/0306329 A1* | 12/2010 | Kinoshita | H04L 67/5651<br>709/206 |
| 2012/0246221 A1* | 9/2012 | Miyawaki | G06F 21/6236<br>709/203 |
| 2013/0053133 A1* | 2/2013 | Schueller | G06Q 20/3255<br>463/25 |
| 2013/0117400 A1* | 5/2013 | An | H04L 9/3263<br>709/206 |
| 2013/0136130 A1* | 5/2013 | Tanimoto | H04L 12/462<br>370/392 |
| 2014/0280774 A1* | 9/2014 | Kaminushi | H04L 63/029<br>709/219 |
| 2014/0337951 A1* | 11/2014 | Lee | H04L 63/08<br>726/7 |
| 2015/0371417 A1* | 12/2015 | Angelov | G06Q 10/101<br>345/442 |
| 2016/0094522 A1* | 3/2016 | Stuntebeck | H04L 51/18<br>713/152 |
| 2018/0322403 A1* | 11/2018 | Ron | G06Q 10/107 |
| 2019/0327135 A1* | 10/2019 | Johnson | H04W 4/70 |
| 2021/0117538 A1* | 4/2021 | Ono | G06F 21/568 |
| 2023/0209547 A1* | 6/2023 | Jonytis | H04L 41/0816<br>370/329 |

* cited by examiner

200

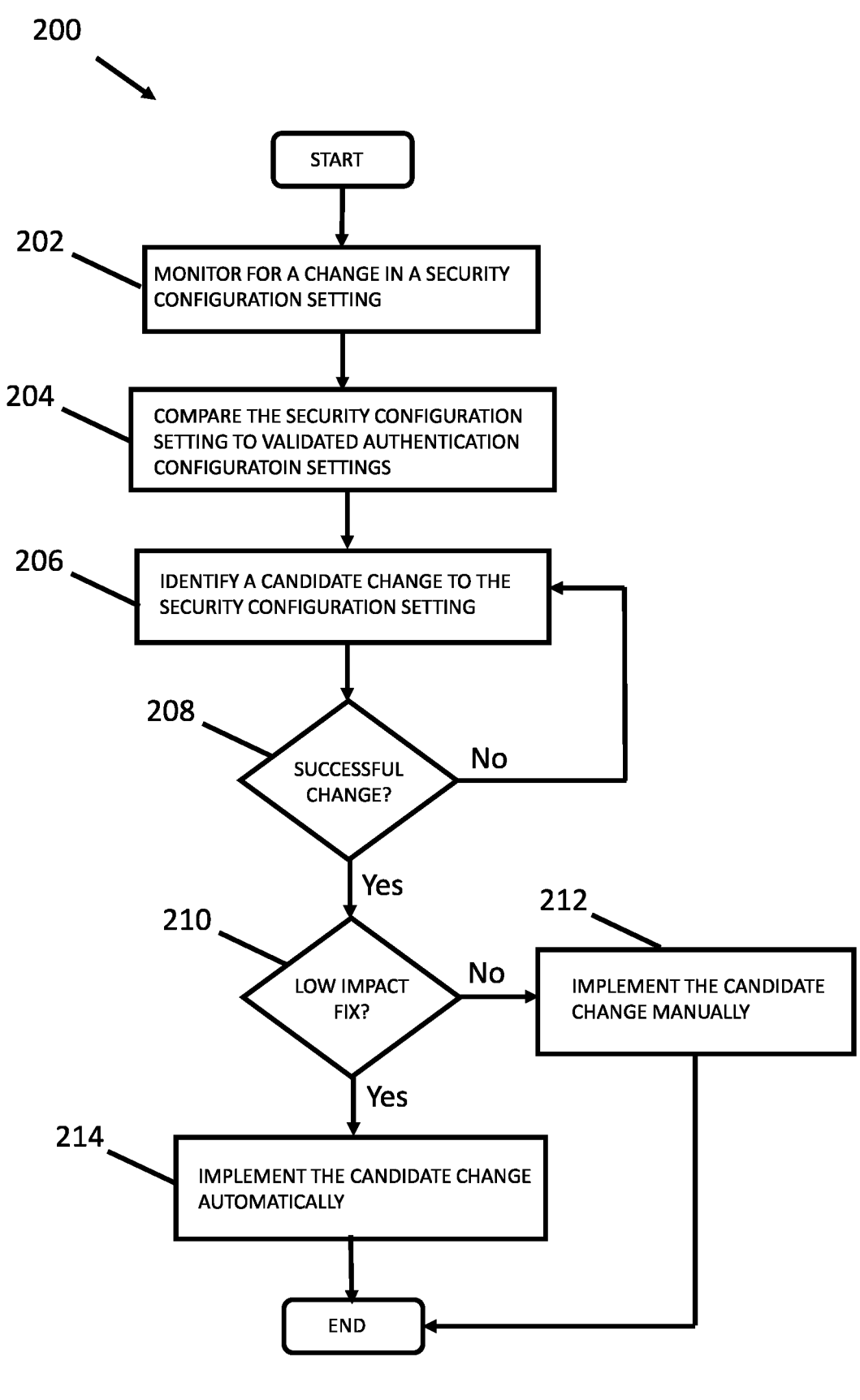

START

202 — MONITOR FOR A CHANGE IN A SECURITY CONFIGURATION SETTING

204 — COMPARE THE SECURITY CONFIGURATION SETTING TO VALIDATED AUTHENTICATION CONFIGURATOIN SETTINGS

206 — IDENTIFY A CANDIDATE CHANGE TO THE SECURITY CONFIGURATION SETTING

208 — SUCCESSFUL CHANGE?    No

Yes

210 — LOW IMPACT FIX?    No    212 — IMPLEMENT THE CANDIDATE CHANGE MANUALLY

Yes

214 — IMPLEMENT THE CANDIDATE CHANGE AUTOMATICALLY

END

FIG. 2

SYSTEM AND METHOD FOR SERVER MONITORING AND PROBLEM RESOLUTION FOR ELECTRONIC MAIL MESSAGES

TECHNICAL FIELD

The present disclosure relates generally to server communication and security, and more specifically to a system and method for server monitoring and problem resolution for electronic mail messages.

BACKGROUND

It is common to include a relay SMTP server to protect SMTP services from untrusted SMTP servers. While adding a relay SMTP server improves security, the chance of interruption is increased due to the additional connections and security settings. Uptime for SMTP services is important to institutions since electronic mail messages are used for critical business processes, customer interaction, and vulnerability remediation.

SUMMARY

The system described in the present application provides practical applications and technical advantages that overcome the current technical problems described herein. Embodiments of the present disclosure are integrated into a practical application that improves service availability of servers and relay servers that regulate electronic mail messages to prevent downtime caused by changes to security configuration settings implemented in a deployment. The security configuration settings may result in electronic mail messages being denied by the relay server requiring users to resend emails, which creates bottlenecks in the network. Thus, by improving uptime of servers and relay servers and reducing the need to resend electronic mail messages, the present disclosure decreases bottlenecks in the network and saves network resources. Further, by improving uptime of servers and relay servers and increasing the likelihood that electronic mail messages are delivered, we reduce the risk that downstream operations that rely on the electronic mail messages will malfunction. This improves the operation of downstream servers, processors, and other computing equipment. Embodiments of the present disclosure also provide a practical application that improves service availability of servers and relay servers using a machine learning module that predicts whether a proposed change to security configuration settings will result in service interruptions. Accordingly, the disclosed system and methods provide improved uptime of servers, which allow institutions to continue using electronic mail messages for critical business processes, customer interaction and vulnerability remediation.

In one embodiment, the present disclosure provides a system comprising a server configured to receive a first electronic mail message and a second electronic mail message from an internal network. The system comprises a relay server configured to receive the first electronic mail message and the second electronic mail message from the server and to deliver the first electronic mail message and the second electronic mail message to an external network. In some embodiments the relay server is configured to allow the delivery of the first electronic mail message when a first security configuration setting is met and to deny the delivery of the first electronic mail message when the first security configuration setting is not met. The relay server may also be configured to allow the delivery of the second mail message when a second security configuration setting is met and to deny the delivery of the second mail message when the second security configuration setting is not met. In some embodiments, the relay server undergoes a deployment that implements a change to the first security setting of the relay server such that the relay server denies the delivery of the first electronic mail message to the external network, and also implements a change to the second security configuration setting such that the relay server allows the delivery of the second electronic message to the external network. The system comprises a monitoring server comprising a processor and a memory, where the processor is operably coupled to the relay server via a network interface. The processor is configured to (i) monitor for a change to the first security configuration setting in the relay server and (ii) compare the change in the first security configuration setting to historical data stored in the memory that contains validated authentication settings that previously allowed for the delivery of a historical electronic mail message to the external network. The processor is further configured to (iii) identify a candidate change to the first security configuration setting based on the comparison of operation (ii), where the candidate change to the first security configuration setting when implemented results in the delivery of the first electronic mail message to the external network. The processor is further configured to (iv) implement the candidate change to the first security configuration setting such that the relay server allows the delivery of the first electronic message to the external network.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates a flowchart of a method according to an embodiment of the present disclosure.

DETAILED DESCRIPTION

Figure 1:
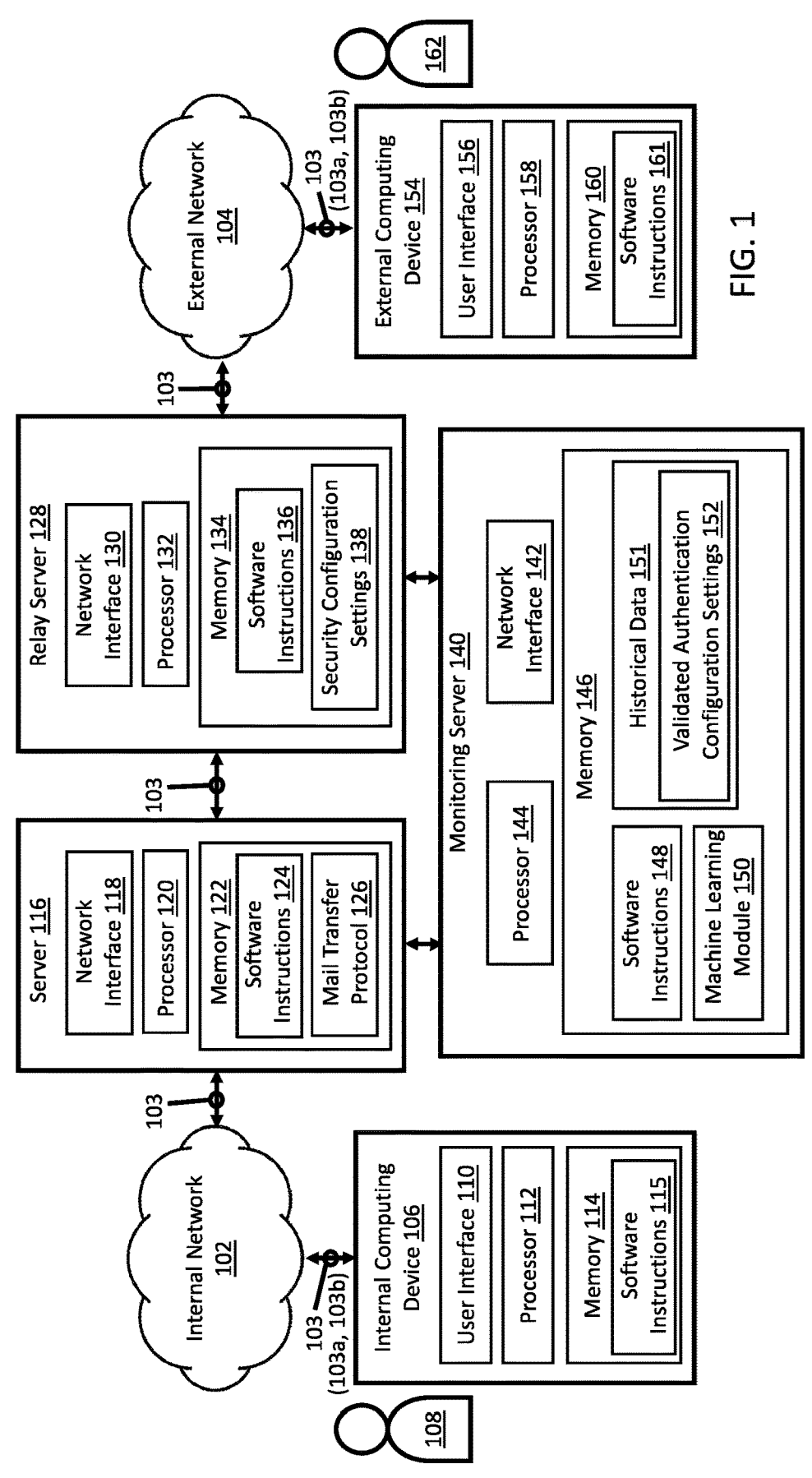
FIG. 1 illustrates an embodiment of a system according to an embodiment of the present disclosure.

As described above, previous technologies fail to provide reliable solutions for reducing interruptions in the delivery of electronic mail messages caused by changes to security configuration settings in relay servers. Embodiments of the present disclosure address the aforementioned drawbacks by providing systems and methods that improve service availability of systems that regulate electronic mail messages to prevent downtime caused by changes to security configuration settings implemented during a deployment. Embodiments of the present disclosure also provide a machine learning module that predicts whether a change to security configuration settings will result in service interruptions. Accordingly, the disclosed system and methods provide improved uptime of servers, which allows institutions to continue using electronic mail messages for critical business processes, customer interaction and vulnerability remediation. Embodiments of the present disclosure and its advantages may be understood by referring to FIGS. 1-2.
System:

FIG. 1 illustrates an embodiment of a system 100 that is generally configured to regulate traffic of one or more electronic mail message 103 between an internal network 102 and an external network 104. The internal network 102 and the external network 104 may be any suitable type of wireless and/or wired network. The internal network 102 and the external network 104 may each respectively include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network that is not connected to the Internet. The network internal network 102 and the external network 104 may be configured to support any suitable type of communication protocol as would be appreciated by one of ordinary skill in the art.

The internal network 102 may be connected to one or more internal computing device(s) 106 that is configured to process data and interact with a first user 108. Similarly, the external network 104 may be connected to one or more external computing device(s) 154 that is configured to process data and interact with a second user 162. The internal and external computing devices 106, 154 may be any suitable computing device including, but are not limited to, a personal computer, a desktop computer, a workstation, a server, a laptop, a tablet computer, or a mobile phone (such as a smartphone). The internal and external computing devices 106, 154 may each include a user interface 110, 154, respectively. Suitable user interfaces 110, 156 comprise, but are not limited to, a display, a microphone, a mouse, a keypad, or other appropriate terminal equipment usable by the first or second user 108, 162 to input data or information into the respective internal or external computing device 106, 154. The internal and external computing device 106, 154 may each include a processor 112, 158, a memory 114, 160 and/or circuitry (not explicitly shown) configured to perform any of the functions or actions of the respective internal or external computing device 106, 154 described herein. For example, a software application 115, 161 designed using software code may be stored in the memory 114, 160 and executed by the processor 112, 158 to perform the functions of the respective internal or external computing device 106, 154. In some embodiments, the internal computing device 106 is configured to generate one or more electronic mail message 103 and transmit the one or more electronic mail message 103 to the internal network 102. The internal computing device 106 is configured to communicate with other devices and servers (e.g., such as a server 116, a relay server 128, a monitoring server 140 and the external network 104) in the system 100, via the internal network 102. In some embodiments, the external computing device 154 is configured to receive the one or more electronic mail message 103 from the external network 104.

In some embodiments, the system 100 comprises a server 116 that is configured to receive one or more electronic mail message 103 from the internal network 102. The server 116 comprises a network interface 118 that is configured to enable wired and/or wireless communications between the server 116 and the internal network 102, as well as other devices and servers in the system 100, such as a relay server 128. Suitable network interfaces include a WIFI interface, a a router. The network interface 118 may be configured to use any suitable type of communication protocol as would be appreciated by one of ordinary skill in the art.

The server 116 comprises a processor 120 configured to send and receive data using the network interface 118. The processor 120 is operatively coupled to a memory 122. The memory 134 may be a non-transitory computer readable medium. For example, the memory 122 may be volatile or non-volatile and may comprise a read-only memory (ROM), random-access memory (RAM), ternary content-addressable memory (TCAM), dynamic random-access memory (DRAM), and static random-access memory (SRAM). The memory 122 may be implemented using one or more disks, tape drives, solid-state drives, and/or the like. The memory 122 is operable to store software instructions 124 and mail transfer protocol 126. The software instructions 124 may comprise any suitable set of instructions, logic rules or code operable to execute the processor 120 to perform the operations of the server 116 described herein.

The processor 120 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 120 may be implemented in cloud devices, servers, virtual machines, and the like. The processor 120 may be a programmable logic device, a microcontroller, a microprocessor, or any suitable combination of the preceding. The processor 120 is configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, registers the supply operands to the ALU and store the results of ALU operations, and a control unit that fetches instructions from memory 122 and executes them by directing the coordinated operations of the ALU, registers and other components. The processor 120 is configured to implement various instructions. For example, the processor 120 is configured to execute instructions (e.g., software instructions 124) to implement the processor 120. In this way, processor 120 may be a special-purpose computer designed to implement the functions disclosed herein. In an embodiment, the processor 120 is implemented using logic units, FPGAs, ASICs, DSPs, or any other suitable hardware. In some embodiments, the processor 120 is configured to is configured to implement a mail transfer protocol 126 for sending and receiving electronic mail messages 103 to various servers and devices in the system 100, such as the internal network 102 and the relay server. In some embodiments, the server 116 is a simple mail transfer protocol (SMTP) server, and the mail transfer protocol is SMTP, which may be configured to send and receive electronic mail messages 103 as would be appreciated by one of ordinary skill in the art.

In some embodiments, the system 100 comprises a relay server 128 that is configured to receive electronic mail messages 103 from the server 116 and is configured to deliver the electronic mail messages 103 to the external network 104. The relay server 128 comprises a network interface 130 that is configured to enable wired and/or wireless communications between the relay server 128 and the server 116, as well as other devices and servers in the system 100, such as the external network 104. Suitable network interfaces include a WIFI interface, a local area network (LAN) interface, a wide area network (WAN) interface, a modem, a switch, or a router. The network interface 130 may be configured to use any suitable type of communication protocol as would be appreciated by one of ordinary skill in the art.

The relay server 128 comprises a processor 132 configured to send and receive data using the network interface 118. The processor 132 is operatively coupled to a memory 134. The memory 134 may be a non-transitory computer readable medium. For example, the memory 134 may be volatile or non-volatile and may comprise a read-only memory (ROM), random-access memory (RAM), ternary content-addressable memory (TCAM), dynamic random-access memory (DRAM), and static random-access memory (SRAM). The memory 134 may be implemented using one or more disks, tape drives, solid-state drives, and/or the like. The memory 134 is operable to store software instructions 126 and security configuration settings 138. The software instructions 126 may comprise any suitable set of instructions, logic rules or code operable to execute the processor 132 to perform the operations of the relay server 128 as described herein.

The processor 132 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 134 may be implemented in cloud devices, servers, virtual machines, and the like. The processor 134 may be a programmable logic device, a microcontroller, a microprocessor, or any suitable combination of the preceding. The processor 134 is configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations, registers the supply operands to the ALU and store the results of ALU operations, and a control unit that fetches instructions from memory 134 and executes them by directing the coordinated operations of the ALU, registers and other components. The processor 132 is configured to implement various instructions. For example, the processor 132 is configured to execute instructions (e.g., software instructions 136) to implement the processor 132. In this way, processor 132 may be a special-purpose computer designed to implement the functions disclosed herein. In an embodiment, the processor 132 is implemented using logic units, FPGAs, ASICs, DSPs, or any other suitable hardware.

In some embodiments, the processor 132 is configured to regulate the electronic mail messages 103 that are sent and received between the server 116 and the external network 104 based on one or more security configuration setting 138 stored in the memory 134 of the relay server 128. The processor 132 of the relay server is configured to allow the delivery of electronic mail messages 103 when one or more security configuration setting 138 is met and to deny the delivery of the electronic mail messages 103 when the one or more security configuration setting 138 is not met. Exemplary security configuration settings 138 comprise, but are not limited to, an allow list (e.g., of IP addresses), a deny list (e.g., of IP addresses), a connection threshold setting, or an encryption protocol. For example, the processor 132 may determine if an electronic mail message 103 received from the server 116 is on an allow list of IP addresses and the relay server 128 may then allow the electronic mail message 103 to be sent to the external network 104. In another example, the processor 132 may determine that the electronic mail message 103 is not on an allow list of IP addresses and deny the electronic mail message 103 from being sent from the server 116 to the external network 104. In some embodiments, the connection threshold control setting is a predetermined number of electronic mail messages 103 that may be sent between the server 116 and the external network 104 over a duration, where the relay server 128 allows electronic mail messages 103 to be sent from the server 116 to the external network 104 up to the pre-determined number within the duration. As one practical example, the connection threshold control setting may limit the number of electronic mail messages 103 that may be sent between the server 116 and the external network 104 to be 5,000 electronic mail messages per day. If the number of electronic mail messages 103 sent between the server 116 and the external network 104 exceeds 5,000 then the relay server will deny any subsequent electronic mail message 103 over the pre-determined number within the duration. The pre-determined number and duration may be any number or duration and varies based on the size of the servers and the desired application. In some embodiments, the encryption protocol is encryption or authentication of the electronic mail messages 103 that protects the contents from being read by entities other than the intended recipient. The relay server 128 may determine if the electronic mail message 103 sent from the server 116 includes encryption or authentication based on the encryption protocol, and allow the electronic mail message 103 to be sent to the external network 104 if the electronic mail message 103 includes the encryption or authentication or deny the electronic mail message 103 if the electronic mail message 103 does not include the encryption or authentication. Exemplary encryption comprises, but is not limited to, transport-level encryption, end-to-end encryption, or public-key cryptography.

In some embodiments, a deployment may be implemented to change one or more of the security configuration settings of the relay server 128. The deployment may be initiated, for example, to update the encryption or authentication of the electronic mail messages 103, update the allow or deny list, or to update the connection threshold control setting. In some instances, the changes to the one or more security configuration setting cause interruptions in the communication of electronic mail messages 103 between the internal network 102 and the external network 104, where the electronic email messages 103 become denied by the relay server 128 leading to service downtime. The system 100 comprises a monitoring server 140 that reduces or prevents downtime caused by changes in the one or more security configuration settings in the relay server 128.

In some embodiments, the monitoring server 140 comprises a network interface 142 that is configured to enable wired and/or wireless communications between the monitoring server 140, the server 116, and the relay server 128. Suitable network interfaces include a WIFI interface, a a router. The network interface 142 may be configured to use any suitable type of communication protocol as would be appreciated by one of ordinary skill in the art.

The monitoring server 140 includes a processor 144 configured to send and receive data using the network interface 142. The processor 144 is operatively coupled to a memory 146. The memory 146 may be a non-transitory computer readable medium. For example, the memory may be volatile or non-volatile and may comprise a read-only memory (ROM), random-access memory (RAM), ternary content-addressable memory (TCAM), dynamic random-access memory (DRAM), and static random-access memory (SRAM). The memory 146 may be implemented using one or more disks, tape drives, solid-state drives, and/or the like. The memory 146 is operable to store software instructions 148, a machine learning module 150, and historical data containing validated authentication configuration settings 152. The software instructions 148 may comprise any suitable set of instructions, logic rules or code operable to execute the processor 144 to perform the operations of the monitoring server 140 described herein.

The processor 144 is any electronic circuitry, including, but not limited to, state machines, one or more central processing unit (CPU) chips, logic units, cores (e.g., a multi-core processor), field-programmable gate arrays (FP-GAs), application-specific integrated circuits (ASICs), or digital signal processors (DSPs). For example, the processor 144 may be implemented in cloud devices, servers, virtual machines, and the like. The processor 144 may be a programmable logic device, a microcontroller, a microprocessor, or any suitable combination of the preceding. The processor 144 is configured to process data and may be implemented in hardware or software. For example, the processor 120 may be 8-bit, 16-bit, 32-bit, 64-bit, or of any other suitable architecture. The processor 144 may include an arithmetic logic unit (ALU) for performing arithmetic and logic operations, registers the supply operands to the ALU and store the results of ALU operations, and a control unit that fetches instructions from memory 146 and executes them by directing the coordinated operations of the ALU, registers and other components. The processor 144 is configured to implement various instructions. For example, the processor 144 is configured to execute instructions (e.g., software instructions 148) to implement the processor 144. In this way, processor 120 may be a special-purpose computer designed to implement the functions disclosed herein. In an embodiment, the processor 144 is implemented using logic units, FPGAs, ASICs, DSPs, or any other suitable hardware.

In some embodiments, the processor 144 is configured to monitor for a change in one or more network security configuration setting 138 in the relay server 128. In some instance, the change in the one or more network security configuration setting 138 may result in the relay server 128 denying the delivery of the electronic mail message 103 to the external network 104. The processor 144 is configured to compare the change in the one or more network security configuration setting 138 to historical data 151 stored in the memory 146 that contains validated authentication configuration settings 152 that previously allowed for the delivery of a historical electronic mail message 103 to the external network 104. The processor 144 is configured to identify a candidate change to the one or more security configuration setting 138 based on the comparison that, when implemented, results in the delivery of the electronic mail message 103 to the external network. For example, a change may be implemented during a deployment to the security configuration setting 138 where an intended recipient is added to a deny list resulting in the relay server 128 denying the electronic mail message 103 from being sent to the external network 104. The validated authentication configuration settings 152 may show the intended recipient was previously on the allow list which allowed delivery of a historical electronic mail message to the external network

104 under the previous settings. The monitoring server 140 may identify changing the intended recipient from the deny list to the allow list as a candidate change such that when implemented in the relay server 128, the relay server 128 allows the delivery of the electronic mail message 103 to the external network 104. As another example, a change may be implemented during a deployment to the security configuration setting 138 to update the encryption or authentication settings, which results in the relay server 128 denying the electronic mail message 103 from being sent from the server 116 to the external network 104. The validated authentication configuration settings 152 may include one or more validated encryption or validated authentication settings that the relay server 128 previously allowed to be delivered to the external network 104. The monitoring server 140 may identify the previously validated encryption or authentication settings as one or more candidate change that when implemented in the relay server 128 allows for the delivery of a historical electronic mail message to the external network 104. In some embodiments, the processor 144 is further configured to implement the candidate change to the one or more security configuration setting such that the relay server 128 allows the delivery of the electronic mail message 103 to the external network 104.

In addition to real-time monitoring for changes, the monitoring server 140 may also pro-actively determine if a change to the security configuration setting 138 would result in the relay server 128 allowing or denying an electronic mail message 103 from being delivered to the external network 104. The monitoring server 140 may perform such predictive analysis using a machine learning module 150. The machine learning module 150 may comprise a support vector machine, neural network, random forest, or k-means clustering. In another example, the machine learning module 150 may be implemented by a plurality of neural network (NN) layers, Convolutional NN (CNN) layers, Long-Short-Term-Memory (LSTM) layers, Bi-directional LSTM layers, or Recurrent NN (RNN) layers. In another example, the machine learning module 150 may be implemented by Natural Language Processing (NLP).

In some embodiments, the machine learning module 150 is trained based on feature variables from the validated authentication security configuration settings 152 that allowed for historical messages to be delivered to the external network 104. In some embodiments, the processor 144 is configured to determine using the machine learning module that a change to the one or more security configuration setting 138 would result in the relay server 128 allowing the electronic mail message 103 to be delivered to the external network 104. The processor 144 may then implement the change to the one or more security configuration setting 138 to allow the delivery of the electronic mail message 103 to the external network 104. In some embodiments, the processor 144 may determine using the machine learning module that the change to the security configuration setting 138 would result in the relay server 128 denying the electronic mail message 103 to be delivered to the external network 104 and determine a candidate change for altering the change to the one or more security configuration setting 138 that would result in the relay server allowing the one or more electronic mail message 103 to be delivered to the external network 104. In some embodiments, the processor 144 is configured to generate a report containing the candidate change and instructions for a user to manually alter the security configuration setting 138. The processor 144 may be further configured to display the report to the user. In some embodiments, the processor 144 is configured to automatically implement the change to allow the electronic mail message 103 to be delivered to the external network 104.

Example Application

The following provides a non-limiting example application of using the system 100 to monitor for changes in security configuration settings 138 following a deployment that implements a change to a first security configuration setting and a second security configuration setting in the security configuration settings 138.

In the example application, the internal computing device 106 generates and sends a first electronic mail message 103*a* and a second electronic mail message 103*b* to the server 116 via the internal network 102. The relay server 128 receives the first electronic mail message 103*a* from the server 116 and allows the delivery of the first electronic mail message 103*a* to the external computing device 154 via external network 104 when a first security configuration setting is met and denies the delivery of the of the first electronic message 103*a* when the first security configuration is not met. Similarly, the relay server 128 receives the second electronic mail message 103*b* from the server 116 and allows the delivery of the second electronic mail message 103*b* to the external computing device 154 via external network 104 when a second security configuration setting is met and denies the delivery of the of the second electronic message 103*b* when the second security configuration is not met.

In the example application, the deployment implements a change to the first security configuration setting of the relay server 128 such that the relay server 128 denies the delivery of the first electronic mail message 103*a* to the external network 104. Additionally, the deployment implements a change to the second security configuration setting such that the relay server 128 allows the delivery of the second mail message 103*b* to the external network 104.

The processor 144 of the monitoring server 140 monitors the change to the first configuration setting in the relay server 128 and compares the change in the first security configuration setting to historical data 151 stored in the memory 146 that contains validated authentication configuration settings 152 that previously allowed for the delivery of a historical electronic mail message to the external network 104. The processor further identifies a candidate change to the first security configuration based on the comparison, where the candidate change to the first security configuration setting when implemented results in the delivery of the first electronic mail message 103*a* to the external network 104. The processor 144 further implements the candidate change to the first security configuration setting such that the relay server allows the delivery of the first electronic message to the external network.

In the example application, a second deployment implements a second change to the first security configuration setting. The machine learning module 150 in the monitoring server 140 determines whether the second change to the first security configuration setting would result in the relay server 128 allowing or denying the first electronic mail message 103*a* to be delivered to the external network 104. The processor 144 may determine, using the machine learning module 150, that the second change to the first security configuration setting would result in the relay server 128 allowing the first electronic message 103*a* to be delivered to the external network 104, and implements the second change to the first security configuration setting in the relay server 128 to allow the delivery of the first electronic message 103*a* to the external network 104. Alternatively, the processor 144 may determine, using the machine learning module 150, that the second change to the first security configuration setting would result in the relay server 128 denying the first electronic message 103*a* to be delivered to the external network 104, and determine a second candidate change for altering the second change to the first security configuration setting such that it would result in the relay server 128 allowing the first electronic message 103*a* to be delivered to the external network 104. In some embodiments, the processor 144 generates a report containing the second candidate change and instructions for a user to manually alter the first security configuration setting. The report may be displayed to a user (e.g., using a display of a computing device). In some embodiments, the processor implements the second candidate change automatically to allow the first electronic mail message 103*a* to be delivered to the external network 104.

Method:

FIG. 2 illustrates an example method 200 of using the system 100 according to some embodiments of the present disclosure. The method 200 may begin at operation 202 and comprises monitoring for a change in one or more security configuration 138 in a relay server 128. At operation 202, the method 200 further comprises comparing the one or more security configuration setting 138 to historical data that contains validated authentication configuration settings 152 that previously allowed for the delivery of historical electronic mail messages 103 to the external network 104.

At operation 204, the method 200 comprises identifying a candidate change to the one or more security configuration setting 138 based on the comparison of operation 202. In some embodiments, the method further includes, at operation 206, determining if the candidate change results in the delivery of the first electronic mail message 103 to the external network 104. At decision block 208, if it is determined that the candidate change will not result in the delivery of the electronic mail message 103, then operation 206 is repeated to identify another candidate change. The method 200 may determine whether a candidate change will result in delivery of the electronic mail message 103 using the machine learning module 150. For example, the method 200 may include determining, using the machine learning module 150, whether the candidate change or any change to the one or more security configuration setting would result in the relay server 128 allowing or denying the electronic mail message 103 to be delivered to the external network 104.

Once a successful candidate change has been identified in decision block 208, the method 200 may comprise determining if the candidate change is associated with a low impact fix or a high impact fix, as indicated in decision block 210. Examples of low impact fixes include altering the allow list or deny list accordingly to allow the delivery of electronic mail messages 103 to the external server 104, and increasing or decreasing the connection threshold control to a pre-determined number and duration that allows the delivery of electronic mail messages 103 to the external server 104. If it is determined in decision block 210 that the candidate change is associated with a low impact fix, operation 208 includes implementing the candidate change automatically, as indicated in operation 214. Examples of high impact fixes include altering encryption or authentication settings. If it is determined in decision block 210 that the candidate change is associated with a high impact fix, the method may include implementing the change manually by a user, as shown in operation 212. In some embodiments, operation 212 includes generating a report containing the change and instructions for the user to manually alter the one or more security configuration setting 138. Operation 212 may also include displaying, using a display of a computing device, the report to the user. Once the candidate change is implemented, the method 200 may end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a server configured to implement a mail transfer protocol for communication of electronic mail messages between computing devices;
   a relay server configured to regulate the electronic mail messages that are sent and received between the server and an external network based on one or more security configuration settings,
wherein the relay server is configured to allow delivery of the electronic mail messages received from the server to the external network when the one or more security configuration settings are met and deny the delivery when the one or more security configuration settings are not met; and
   a monitoring server comprising a processor and a memory, the processor operably coupled with the relay server via a network interface, the processor configured to:
train a machine learning module to predict whether changes made to the security configuration settings at the relay server are to cause the relay server to deny delivery of one or more electronic mail messages to the external network and to determine candidate changes to the security configuration settings to cause the relay server to allow delivery of the one or more electronic mail message to the external network, wherein the machine learning module is trained based on historical security configuration settings at the relay server that previously allowed historical electronic mail messages to be delivered to the external network; execute the machine learning module to:

monitor, by the machine learning module, for changes to the security configuration settings at the relay server; detect, by the machine learning module based on the monitoring, a change to a first security configuration setting at the relay server;
compare, by the machine learning module, the change in the first security configuration setting at the relay server to the historical security configuration settings at the relay server that previously allowed the relay server to forward historical electronic mail messages received from the server to a first recipient in the external network;
predict, by the machine learning module based on the comparing, that the change in the first security configuration setting will cause the relay server to deny delivery of future electronical mail messages to the first recipient in the external network; and
identify, by the machine learning module, a candidate change to the first security configuration setting at the relay server based on the comparing such that the candidate change to the first security configuration setting when implemented at the relay server causes the relay server to allow forwarding of the future electronic mail message received from the server to the first recipient in the external network, wherein the candidate change implemented during a deployment to update the security configuration settings by rolling back the first security configuration setting to the historical security configuration settings at the relay server that previously allowed the relay server to forward historical electronic mail messages received from the server to the first recipient in the external network; and
perform the candidate change to the first security configuration setting at the relay server to cause the relay server to forward the future electronic mail messages received from the server to the first recipient in the external network, wherein performing the candidate change comprises rolling back the first security configuration setting to the historical security configuration settings at the relay server that previously allowed the relay server to forward historical electronic mail messages received from the server to the first recipient in the external network.

2. The system of claim 1, wherein the server comprises a simple mail transfer protocol (SMTP) server and the relay server comprises a SMTP relay server.

3. The system of claim 1, wherein the first security configuration setting is selected from an allow list of IP addresses, a deny list of IP addresses, a connection threshold control setting, or an encryption protocol.

4. The system of claim 1, wherein the processor is configured to:
   determine, using the machine learning module, that a second change to the first security configuration setting will result in the relay server allowing a first electronic message to be delivered to the external network; and
   deploy the second candidate change to the first security configuration setting in the relay server to allow the delivery of the first electronic message to the external network.

5. The system of claim 1, wherein the processor is configured to:
   determine, using the machine learning module, that a second change to the first security configuration setting will result in the relay server denying a first electronic message to be delivered to the external network; and
   determine a second candidate change for altering the second change to the first security configuration setting that will result in the relay server allowing the first electronic message to be delivered to the external network.

6. The system of claim 5, wherein the processor is configured to:

generate a report containing the second candidate change and instructions for a user to manually alter the first security configuration setting; and display the report to a user.

7. The system of claim 5, wherein the processor is configured to:

implement the second candidate change automatically to allow the first electronic message to be delivered to the external network.

8. A non-transitory computer readable medium storing instructions that when executed by a processor cause the processor to:

train a machine learning module to predict whether changes made to security configuration settings at a relay server are to cause the relay server to deny delivery of one or more electronic mail messages to an external network and to determine candidate changes to the security configuration settings to cause the relay server to allow delivery of the one or more electronic mail message to the external network, wherein the machine learning module is trained based on historical security configuration settings at the relay server that previously allowed historical electronic mail messages to be delivered to the external network;

execute the machine learning module to:

monitor, by the machine learning module, for changes to the security configuration settings at the relay server;

detect, by the machine learning module, based on the monitoring, a change to a first security configuration setting at the relay server;

compare, by the machine learning module, the change in the first security configuration setting at the relay server to the historical security configuration settings at the relay server that previously allowed the relay server to forward historical electronic mail messages received from the server to a first recipient in the external network;

predict, by the machine learning module, based on the comparing, that the change in the first security configuration setting will cause the relay server to deny delivery of future electronical mail messages to the first recipient in the external network; and identify, by the machine learning module, a candidate change to the first security configuration setting at the relay server based on the comparing such that the candidate change to the first security configuration setting when implemented at the relay server causes the relay server to allow forwarding of the future electronic mail message received from the server to the first recipient in the external network, wherein the candidate change implemented during a deployment to update the security configuration settings by rolling back the first security configuration setting to the historical security configuration settings at the relay server that previously allowed the relay server to forward historical electronic mail messages received from the server to the first recipient in the external network; and perform the candidate change to the first security configuration setting at the relay server to cause the relay server to forward the future electronic mail messages received from the server to the first recipient in the external network, wherein performing the candidate change comprises rolling back the first security configuration setting to the historical security configuration settings at the relay server that previously allowed the relay server to forward historical electronic mail messages received from the server to the first recipient in the external network.

9. The non-transitory computer readable medium of claim 8, wherein the first security configuration setting is selected from an allow list of IP addresses, a deny list of IP addresses, a connection threshold control setting, an encryption protocol, or a firewall protocol.

10. The non-transitory computer readable medium of claim 8, wherein the instructions when executed by the processor further cause the processor to:

determine, using the machine learning module, that a second change to the first security configuration setting will result in the relay server allowing a first electronic message to be delivered to the external network; and implement the second change to the first security configuration setting in the relay server to allow the delivery of the first electronic message to the external network.

11. The non-transitory computer readable medium of claim 10, wherein the instructions when executed by the processor further cause the processor to:

generate a report containing the second change and instructions for a user to manually alter the first security configuration setting; and display the report to a user.

12. The non-transitory computer readable medium of claim 10, wherein the instructions when executed by the processor further cause the processor to:

implement the second change automatically to the first electronic message to be delivered to the external network.

13. A method comprising:

training a machine learning module to predict whether changes made to security configuration settings at a relay server are to cause the relay server to deny delivery of one or more electronic mail messages to an external network and to determine candidate changes to the security configuration settings to cause the relay server to allow delivery of the one or more electronic mail message to the external network, wherein the machine learning module is trained based on historical security configuration settings at the relay server that previously allowed historical electronic mail messages to be delivered to the external network;

executing the machine learning module to:

monitor, by the machine learning module, for changes to the security configuration settings at the relay server;

detect, by the machine learning module, based on the monitoring, a change to a first security configuration setting at the relay server;

compare, by the machine learning module, the change in the first security configuration setting at the relay server to the historical security configuration settings at the relay server that previously allowed the relay server to forward historical electronic mail messages received from the server to a first recipient in the external network;

predict, by the machine learning module, based on the comparing, that the change in the first security configuration setting will cause the relay server to deny delivery of future electronical mail messages to the first recipient in the external network; and identify, by the machine learning module, a candidate change to the first security configuration setting at the relay server based on the comparing such that the candidate change to the first security configuration setting when implemented at the relay server causes the relay server to allow forwarding of the future electronic mail message received from the server to the first recipient in the external network, wherein the candidate change implemented during a deployment to update the security configuration settings by rolling back the first security configuration setting to the historical security configuration settings at the relay server that previously allowed the relay server to forward historical electronic mail messages received from the server to the first recipient in the external network; and (iv) perform the candidate change to the first security configuration setting at the relay server to cause the relay server to forward the future electronic mail messages received from the server to the first recipient in the external network, wherein performing the candidate change comprises rolling back the first security configuration setting to the historical security configuration settings at the relay server that previously allowed the relay server to forward historical electronic mail messages received from the server to the first recipient in the external network.

14. The method of claim 13 further comprising:

determining, using the machine learning module, that a second change to the first security configuration setting will result in the relay server allowing a first electronic message to be delivered to the external network; and implementing the second change to the first security configuration in the relay server to allow the delivery of the first electronic message to the external network.

15. The method of claim 14 further comprising:

generating a report containing the second change and instructions for a user to manually alter the at least one security configuration setting; and displaying the report to a user.

16. The method of claim 14 further comprising:

implementing the second change automatically to the first electronic message to be delivered to the external network.

17. The method of claim 13, wherein the first security configuration setting is selected from an allow list of IP addresses, a deny list of IP addresses, a connection threshold control setting, an encryption protocol, or a firewall protocol.

* * * * *